United States Patent
Reszewicz

(10) Patent No.: US 10,072,767 B2
(45) Date of Patent: Sep. 11, 2018

(54) CHECK VALVE DUAL-ORIFICE CHAMFERED HOUSING

(71) Applicant: HS WROCLAW SP. Z O.O, Wroclaw (PL)

(72) Inventor: Modest Adam Reszewicz, Wroclaw (PL)

(73) Assignee: HS WROCLAW SP. Z O.O, Wroclaw (PL)

( * ) Notice: Subject to any disclaimer, the term of this patent is extended or adjusted under 35 U.S.C. 154(b) by 0 days.

(21) Appl. No.: 14/885,142

(22) Filed: Oct. 16, 2015

(65) Prior Publication Data

US 2017/0108133 A1    Apr. 20, 2017

(51) Int. Cl.
*F16K 15/03* (2006.01)
*F16K 27/02* (2006.01)

(52) U.S. Cl.
CPC .......... *F16K 15/03* (2013.01); *F16K 27/0218* (2013.01); *F16K 27/0227* (2013.01)

(58) Field of Classification Search
CPC .. F16K 15/03; F16K 27/0218; F16K 27/0227; F16K 15/038; B24B 15/02; B23C 3/05
USPC ..................... 137/512, 512.1, 527
See application file for complete search history.

(56) References Cited

U.S. PATENT DOCUMENTS

| | | | |
|---|---|---|---|
| 2,601,809 A * | 7/1952 | Di Nardo | B23C 3/05 408/110 |
| 4,191,216 A | 3/1980 | Connolly | |
| 4,457,333 A | 7/1984 | Sharp | |
| 6,228,112 B1 | 5/2001 | Klootz | |
| 8,881,767 B2 | 11/2014 | Bartell | |
| 2014/0202562 A1* | 7/2014 | Kamp | F16K 47/00 137/512.1 |
| 2015/0247420 A1* | 9/2015 | Leblanc | F16K 15/181 251/301 |

FOREIGN PATENT DOCUMENTS

| | | |
|---|---|---|
| JP | S4836531 B1 | 11/1973 |
| KR | 20000024245 A | 5/2000 |

OTHER PUBLICATIONS

Extended European Search Report for International Application No. 16194239.6, dated Feb. 15, 2017, 9 pages.

\* cited by examiner

*Primary Examiner* — Craig Schneider
*Assistant Examiner* — P. Macade Nichols
(74) *Attorney, Agent, or Firm* — Cantor Colburn LLP

(57) ABSTRACT

A check valve includes a housing including a septum separating at least two openings formed therein, the openings being defined by an outer edge and one or more petals pivotably coupled together along the septum to occupy respective open and closed positions in accordance with a pressure differential of a fluid flow across the check valve. In this aspect, a cut height of the septum is greater than a cut height of at least a portion of the outer edge.

6 Claims, 6 Drawing Sheets

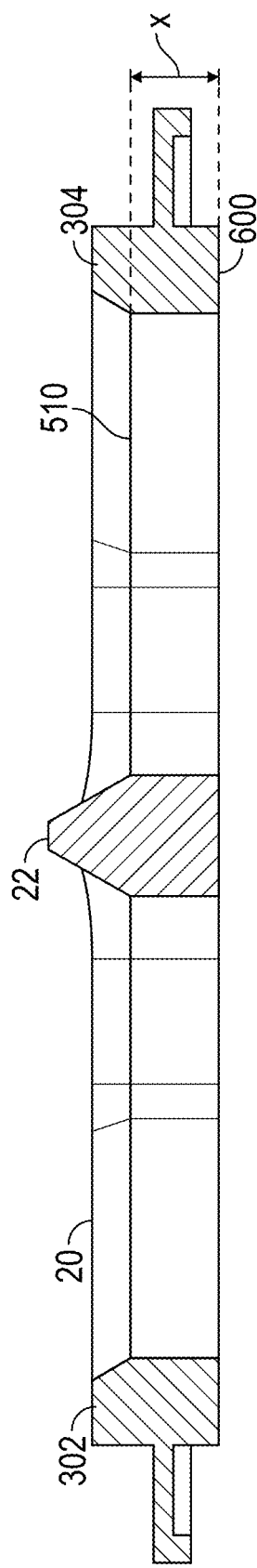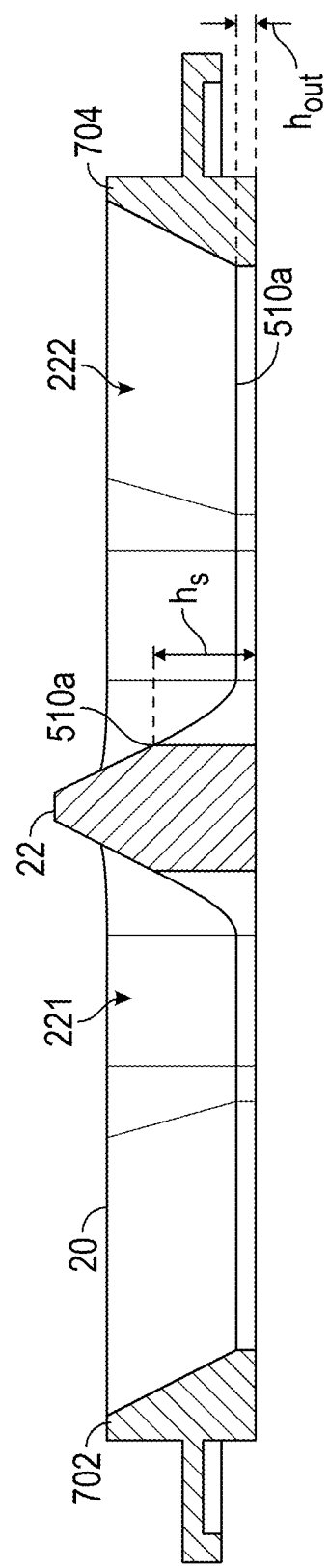
FIG. 6
PRIOR ART
FIG. 7

US 10,072,767 B2

CHECK VALVE DUAL-ORIFICE CHAMFERED HOUSING

BACKGROUND OF THE INVENTION

The subject matter disclosed herein relates to a check valve and, more particularly, to a check valve having petals with lift generating elements, such as airfoils, to counterbalance petal weight.

In bleed systems where fluid pressure can be tapped off from either a high pressure stage compressor or a low pressure stage compressor, a check valve is needed to prevent the high pressure stage bleed air from backflowing into the low pressure stage compressor. This check valve often includes petals that occupy closed positions when the high pressure stage bleed air has a higher pressure than the low pressure stage compressor whereby the high pressure stage bleed air is prevented from backflowing into the low stage compressor. These petals open when the pressure of the low pressure stage compressor exceeds that of the high stage bleed air.

The check valves are often disposed in a vertical arrangement such that the petals sit on washer elements that bear the petal weight. As such, when the petals open and close, contact between the petals and the washer elements leads to wear and damage of the washer elements. This, in turn, leads to contact between the petals and the housing of the check valve.

BRIEF DESCRIPTION OF THE INVENTION

According to one aspect of the invention, a check valve is provided. The check valve includes a housing including a septum separating at least two openings formed therein, the openings being defined by an outer edge and one or more petals pivotably coupled together along the septum to occupy respective open and closed positions in accordance with a pressure differential of a fluid flow across the check valve. In this aspect, a cut height of the septum is greater than a cut height of at least a portion of the outer edge.

According to another aspect, a method of forming a check valve housing is provided. The method includes: receiving an initial housing having two openings, the two openings being separated by a septum and sounded by outer edges of the housing; and removing additional material from the septum and the outer edges such that one a cut height of the septum is greater than the a cut height of at least a portion of the outer edges or a cut distance of the septum is greater than a cut distance of at least a portion of the outer edges.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

FIG. 6 shows a cross section of the housing of FIG. 5B;

FIG. 7 shows a cross section of a housing according to one embodiment;

The detailed description explains embodiments of the invention, together with advantages and features, by way of example with reference to the drawings.

DETAILED DESCRIPTION OF THE INVENTION

In accordance with aspects of the invention, a check valve is provided for use in bleed systems, for example. In such bleed systems, pressures can be tapped off from either a high pressure stage ("high stage") compressor or a low pressure stage ("low stage") compressor. The check valve serves to prevent high stage bleed air from backflowing into the low stage compressor and may be disposed in a substantially vertical formation. The check valve includes petals that occupy respective open and closed positions in accordance with pressure differentials across the check valve and the petals include lift generating elements, such as airfoils, to serve as a counterbalance for the weights of the petals.

Figure 1:
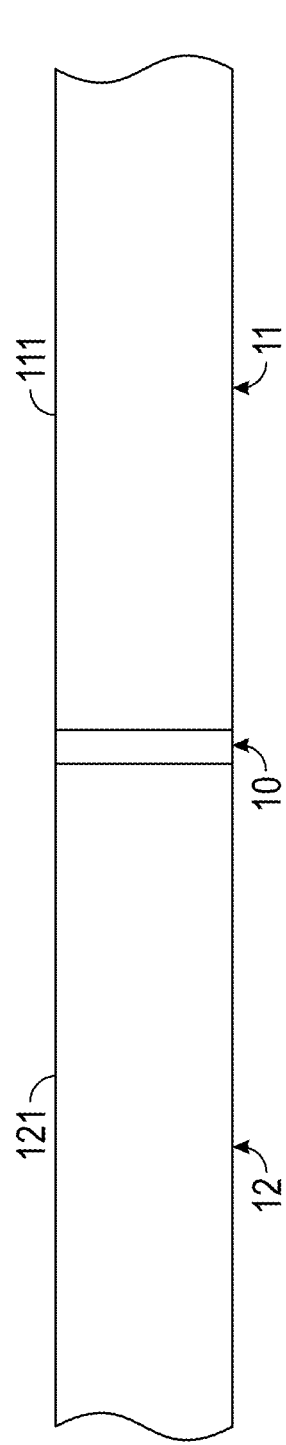
FIG. 1 is a schematic view of a check valve interposed between single ducts.
Figure 2:
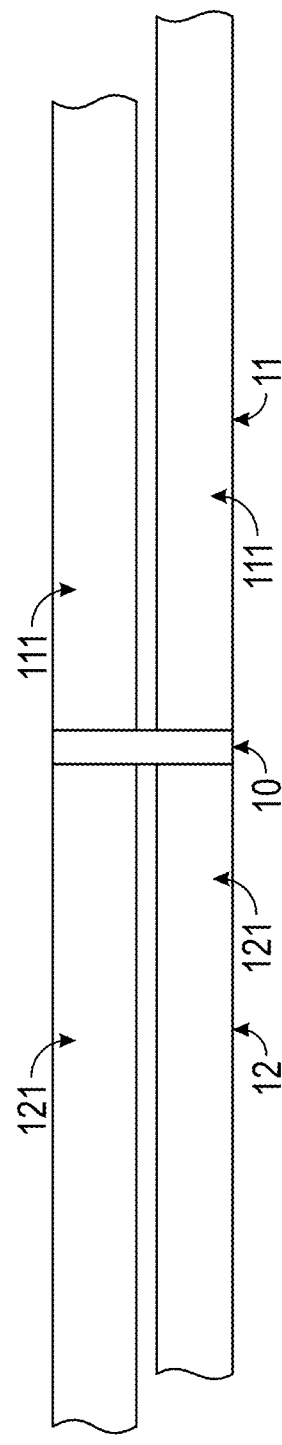
FIG. 2 is a schematic view of a check valve interposed between multiple ducts.

With reference to FIGS. 1 and 2, a check valve 10 is provided. The check valve 10 is interposed between upstream ductwork 11 and downstream ductwork 12. As shown in FIG. 1, the upstream ductwork 11 may be formed of a single duct 111 and the downstream ductwork 12 may be similarly formed of a single duct 121. This configuration is, of course, exemplary, and it is to be understood that alternate configurations are possible. For example, as shown in FIG. 2, the upstream ductwork 11 may be formed of multiple ducts 111 and the downstream ductwork 12 may be similarly formed of multiple ducts 121.

Figure 3:
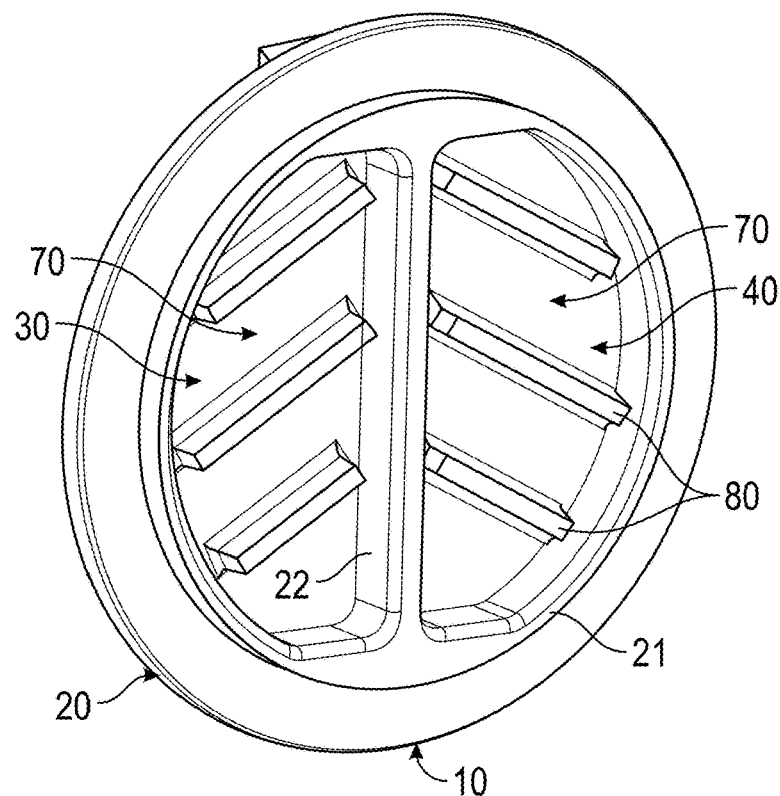
FIG. 3 is a perspective view of a closed check valve with airfoils in accordance with embodiments.
Figure 4:
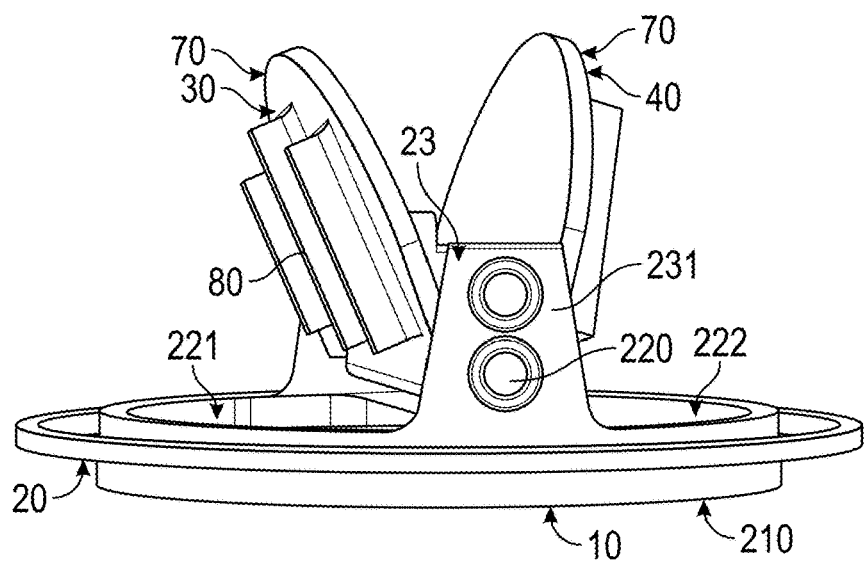
FIG. 4 is a perspective of the check valve of FIG. 3 in an open condition.

With reference to FIGS. 3-4, the check valve 10 includes a check valve body 20 and first and second petals 30 and 40. The check valve body 20 includes a seat 21, a hinge seat 22 (or septum) and a housing 23. The seat 21 is annularly shaped and is formed to define an aperture 210 that extends axially from an upstream side of the seat 21, which is associated with the upstream ductwork 11, to a downstream side of the seat 21, which is associated with the downstream ductwork 12. In accordance with embodiments, the seat 21 may be configured to fit onto the upstream ductwork 11 and the downstream ductwork 12 such that the seat 21 is fluidly interposed between an aft end of the upstream ductwork 11 and a complementary forward end of the downstream ductwork 12.

The bottom of the hinge or septum 22 divides the body into openings as described below. The upper portion of the septum 22 provides for a housing of a pin-hinge with a central pivot axis defined along a pin 220 and may be disposed to bifurcate the aperture 210 defined by the seat 21 to thereby further define a first opening 221 on one side of the hinge 22 and a second opening 222 on the other side of the hinge 22. Sidewalls 231 may be provided to couple a pin 220 through the petals. The first and second petals 30 and 40 are pivotably coupled to the sidewalls 231 to pivot about the central pivot axis in response to a fluid pressure differential between fluid disposed within the upstream ductwork 11 (i.e., high stage bleed fluid) and fluid disposed in the downstream ductwork 12 (i.e., fluid in the low stage compressor). In particular, the first and second petals 30 and 40 are configured to pivot from respective closed positions at which the first and second petals 30 and 40 prevent fluid flow through the first opening 221 and the second opening 222 to respective open positions at which fluid flow through the first opening 221 and the second opening 222 is permitted.

In accordance with embodiments, a pressure differential between the upstream ductwork 11 and the downstream ductwork 12 may be about 20 psi or more. At such pressures, the first and second petals 30 and 40 may be disposed to pivot toward the respective open positions at an angular speed of about 150 radians per second or more.

Figure 5A:
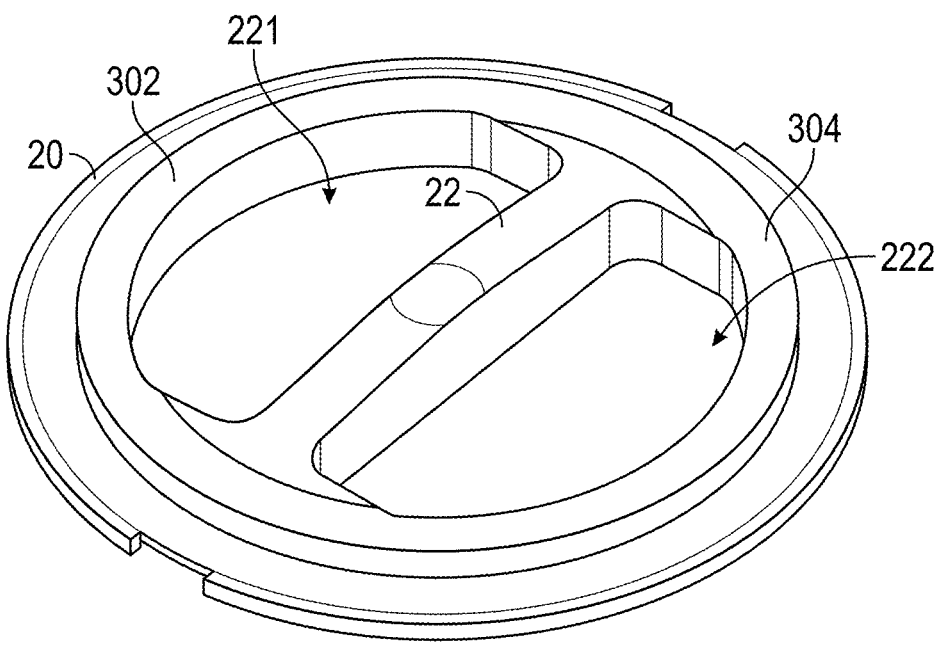
FIGS. 5A and 5B shown a prior art chamfer applied to a housing of a check valve.
Figure 5B:
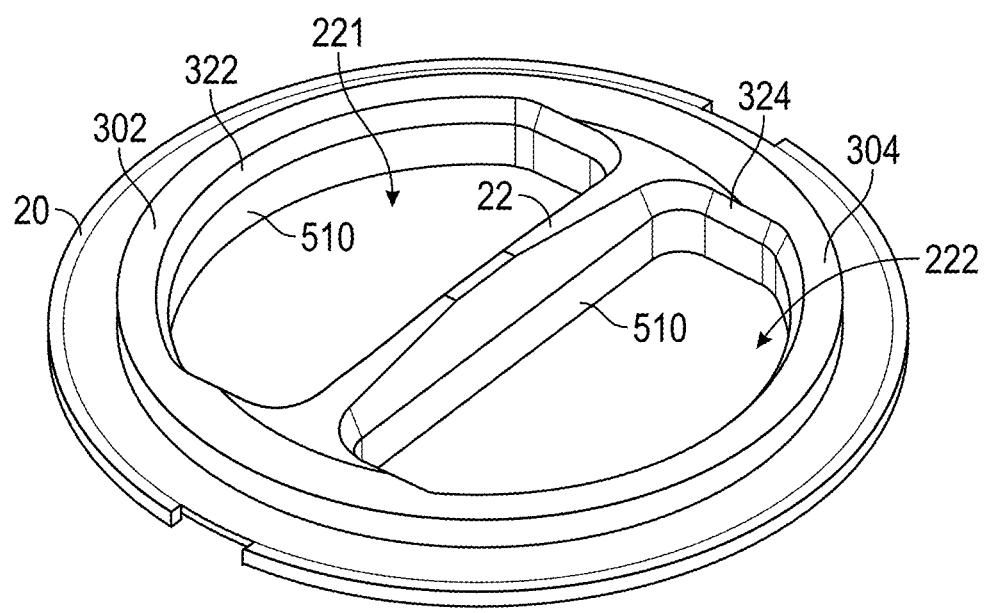

FIGS. 5A and 5B shown openings 221 and 222 formed in the housing 20. The edges of the openings are shown non-chamfered (FIG. 5A) and after being chamfered (FIG. 5B) and separated by the septum 22. The openings may be chamfered along their edges 302, 304 in an effort to reduce weight. In FIG. 5B the chamfered regions are shown as chamfer regions 322, 324. Portions of the outer edges 302, 304 and the septum 22 above a lower chamber edge 510 are removed by a chamfer bit that traces the inner periphery of the openings 221, 222.

In typical prior art situations, the depth of cut on the chamfer bit on the septum 22 and the outer edges 302, 304 is typically the same as is illustrated in FIGS. 5A and 5B. That is, and with reference now to FIG. 6, the distance x from a bottom 600 of the housing 20 to a lower edge 510 of the chamfer regions 320, 322 is the same in both the septum 22 and the outer edges 302, 304.

The inventor named herein has discovered that the outer edges 302, 304 experience less stress than the septum 22 during operation. As such, in one embodiment, more material may be reduced from the outer edges 302, 304 that in the prior art. For ease of description, the distance from the bottom of a housing 20 to a lower edge of a chamfer shall be referred to as the "chamfer height." Embodiments herein have a greater cut height on the septum than on an at least a portion of the outer edges 302, 304. This keeps the septum 22 as strong as in the prior art while reducing weight in regions that experience greater stress during operation.

FIG. 7 shows an example of a housing 20 that may be used in any valve disclosed herein or with other check valves. The housing 20 includes, as above, openings 221 and 222 separated by septum 22. These openings, however, include different chamfer heights along the septum 22 than at the outer edges 702, 704 of the openings 221, 222. In particular, the septum 22 has a chamfer height of $h_s$ and one or both of the outer edges 702, 704 include at least a portion having a smaller chamfer height $h_{out}$. That is, in one embodiment, $h_s$ is greater than $h_{out}$. According to one embodiment, a 13 percent weight reduction may be obtained.

Figure 8:
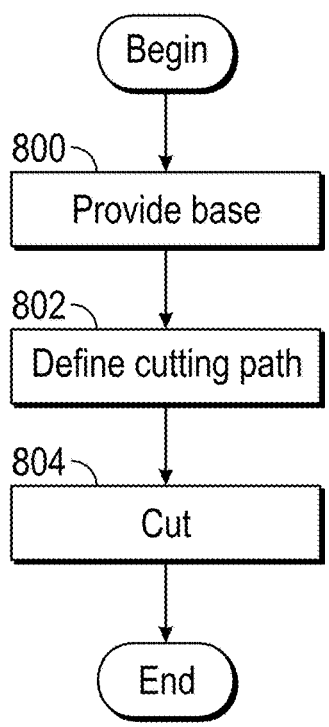
FIG. 8 shows a method of forming a housing according to one embodiment.
Figure 9:
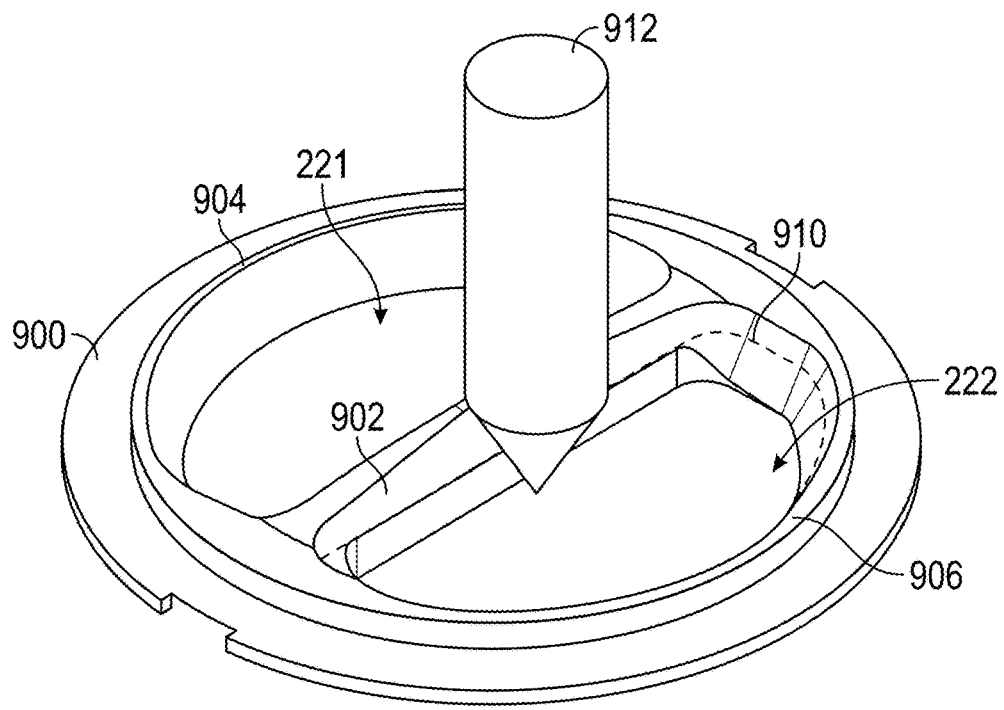
FIG. 9 shows a perspective view of a housing being cut by a cutting element.

As shown in relation to FIGS. 8 and 9, according to one embodiment, the machining process includes providing a housing 900 at block 800. At block 802 a cutting path is defined for one of the openings 221, 222. Of course, a path could be defined for both openings in one embodiment. In the past, as described above, the path was defined such that the chamfer height was the same on the septum 902 and on the outer edges 904, 906. The path is shown as element 910 in FIG. 9. The path is the path that a location on the chamfer bit or other cutting element 912 will take when removing portions of the housing. As illustrated, the path is defined such that the chamfer height on the septum is higher than the chamfer height on at least a portion of the outer edges 904,906. The path may be a single path or may be multiple paths (e.g., more than one pass of the cutting element 912) that lead to the above result. The path may be followed manually or entered into a machine to cause the cutting element 912 to move in the desired manner.

Figure 10A:
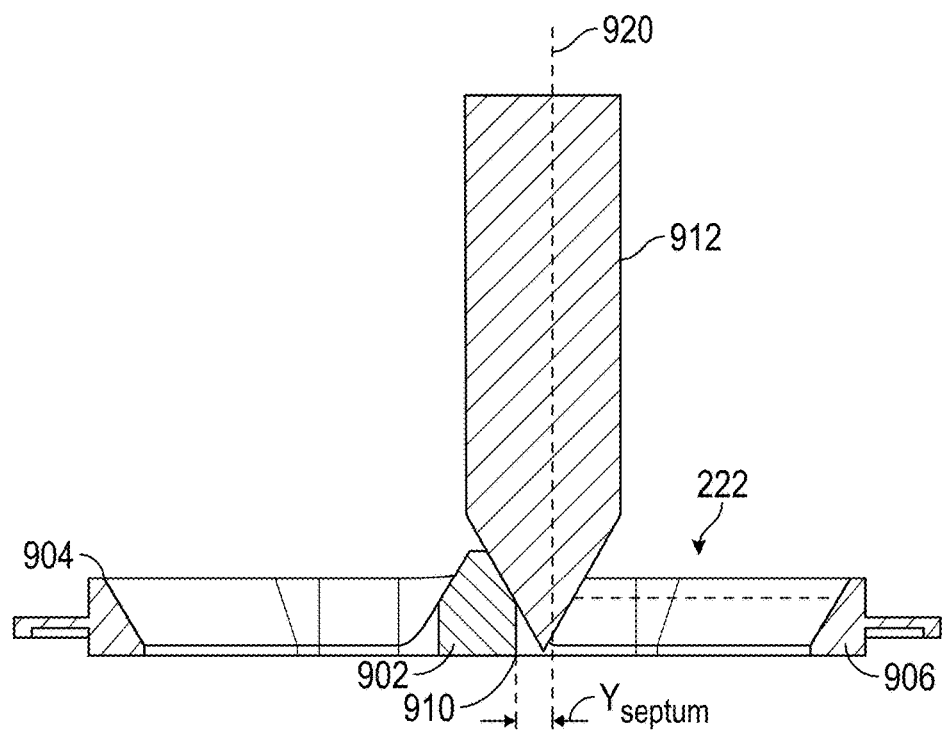
FIGS. 10A and 10B show cross sections of the housing of FIG. 9 as the cutting element is cutting the septum and the outer edges, respectively.
Figure 10B:
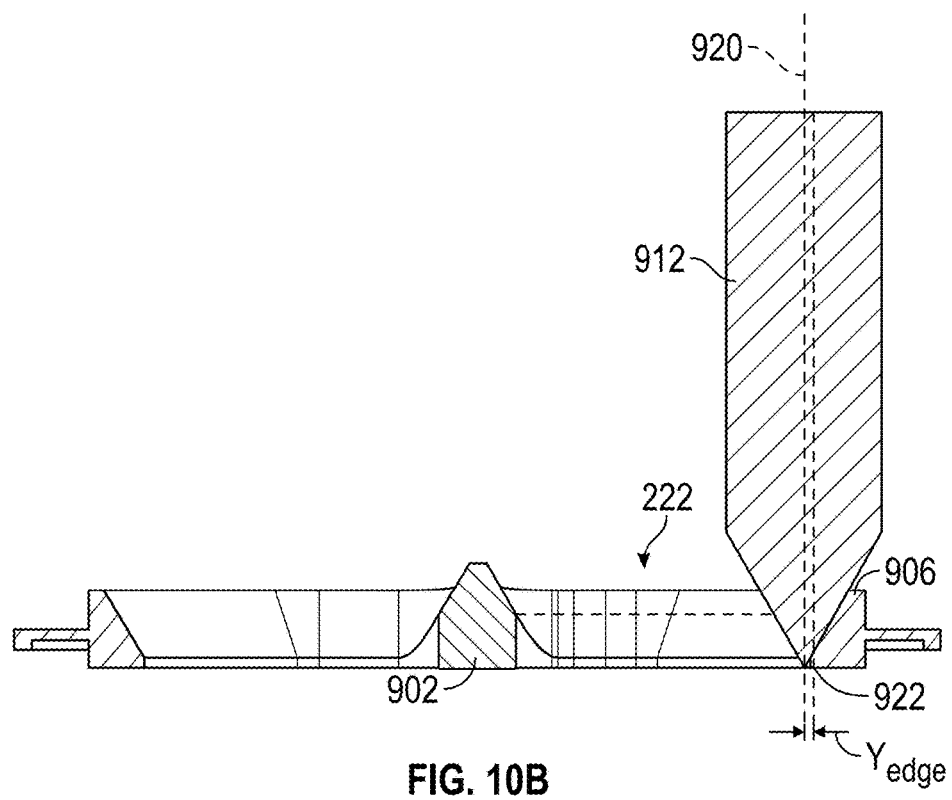

With reference to FIGS. 10A and 10B, according to one embodiment, the path 910 may be defined such that a distance from an axis of rotation 920 of the cutting element 912 to a vertical edge 910 of the septum 902 or a vertical edge 922 of the outer edge 904/906 after being cut by the cutting element 912. In the FIGs., such a distance is shown to as a cut distance y and is greater at the septum 902 than at least one point along the outer edges 904, 906. As illustrated, $y_{septum}$ is greater than $y_{edge}$.

Referring back to FIG. 8, at block 804 the housing is cut. Cutting the housing can include providing the housing 900 to a computer numerical control (CNC) machine. Of course, other types of cutting machines may be used. In one embodiment, while cutting, a tip of the cutting element 912 does not extend below a plane defined by the bottom of the housing. This may allow for producing a piece where $h_s$ is greater than $h_{out}$ or $y_{septum}$ is greater than $y_{edge}$ without having to have a sacrificial piece below the housing when it is cut.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A check valve, comprising:
    a housing including a septum separating at least two openings formed therein, the openings being defined by an outer edge, the septum including a chamfer formed angled portion and a vertical portion below the chamfer formed angled portion, the vertical portion defining a septum cut height, and the outer edge including an edge chamfer formed angled portion and an edge vertical portion below the edge chamfer formed angled portion the edge vertical portion defining an edge cut height; and
    one or more petals pivotably coupled together along the septum to occupy respective open and closed positions in accordance with a pressure differential of a fluid flow across the check valve;
    wherein the septum cut height is greater than the edge cut height.

2. The check valve according to claim 1, wherein the petals are coupled by a hinge and wherein the hinge comprises a pin-hinge.

3. A check valve, comprising:
    a housing including a septum separating at least two openings formed therein, the openings being defined by an outer edge, the septum including a chamfer formed angled portion and a vertical portion below the chamfer formed angled portion, the vertical portion defining a septum cut height, and the outer edge including an edge chamfer formed angled portion and an edge vertical portion below the edge chamfer formed angled portion the edge vertical portion defining an edge cut height; and one or more petals pivotably coupled together along the septum to occupy respective open and closed positions in accordance with a pressure differential of a fluid flow across the check valve;

wherein the septum cut height is greater than the edge cut height;

wherein a cut distance of the septum is greater than a cut distance of at least a portion of the outer edge, the cut distance being defined as distance from an axis of rotation of a cutting element to a vertical edge.

4. The check valve according to claim 3, wherein the petals are coupled by a hinge and wherein the hinge comprises a pin-hinge.

5. The check valve according to claim 3, wherein the cut distance of the septum and the cut distance of the of at least a portion of the outer edge are formed by a chamfer bit.

6. A method of forming a check valve housing comprising:

receiving an initial housing having two openings, the two openings being separated by a septum and surrounded by outer edges of the housing; and removing additional material from the septum and the outer edges such that one of a septum cut height is greater than an edge cut height or a septum cut distance is greater than an edge cut distance, wherein removing the additional material creates a chamfer formed angled portion and on the septum and a vertical portion below the chamfer formed angled portion, the vertical portion defining a septum cut height, and the outer edge including an edge chamfer formed angled portion and an edge vertical portion below the edge chamfer formed angled portion the edge vertical portion defining an edge cut height; and wherein the septum cut distance is defined as a distance from an axis of rotation of a cutting element to the vertical portion on the septum and the edge cut distance is defined a distance from an axis of rotation of a cutting element to the edge vertical portion.

* * * * *